United States Patent

[11] 3,614,286

[72] Inventor George M. Trinite, Jr.
    Sykesville, Md.
[21] Appl. No. 279,641
[22] Filed May 10, 1963
[45] Patented Oct. 19, 1971
[73] Assignee The United States of America as
    represented by the Secretary of the Navy

[54] RADAR PRESENTATION SIMULATOR
    2 Claims, 1 Drawing Fig.
[52] U.S. Cl. .................................................. 35/10.4,
                                                        343/7.3
[51] Int. Cl. .................................................... G01s 9/00
[50] Field of Search ......................................... 35/10.4,
                                        10.2; 343/7.4, 5 EI, 7.3

[56] References Cited
    UNITED STATES PATENTS

| | | | |
|---|---|---|---|
| 2,836,904 | 6/1958 | Hickey .......................... | 35/10.4 |
| 2,869,251 | 1/1959 | Chubb ........................... | 35/10.4 |
| 2,929,157 | 3/1960 | Johnson ........................ | 35/10.4 |
| 3,123,824 | 3/1964 | Sherertz ....................... | 343/5 EI |
| 2,940,073 | 6/1960 | Spranger et al. .............. | 343/7.3 |

Primary Examiner—T. H. Tubbesing
Attorneys—R. I. Tompkins and L. S. Epstein

ABSTRACT: This invention relates to the simulation of radar systems and more particularly to the simulation of radar systems showing representations of aircrafts in typical flight paths.

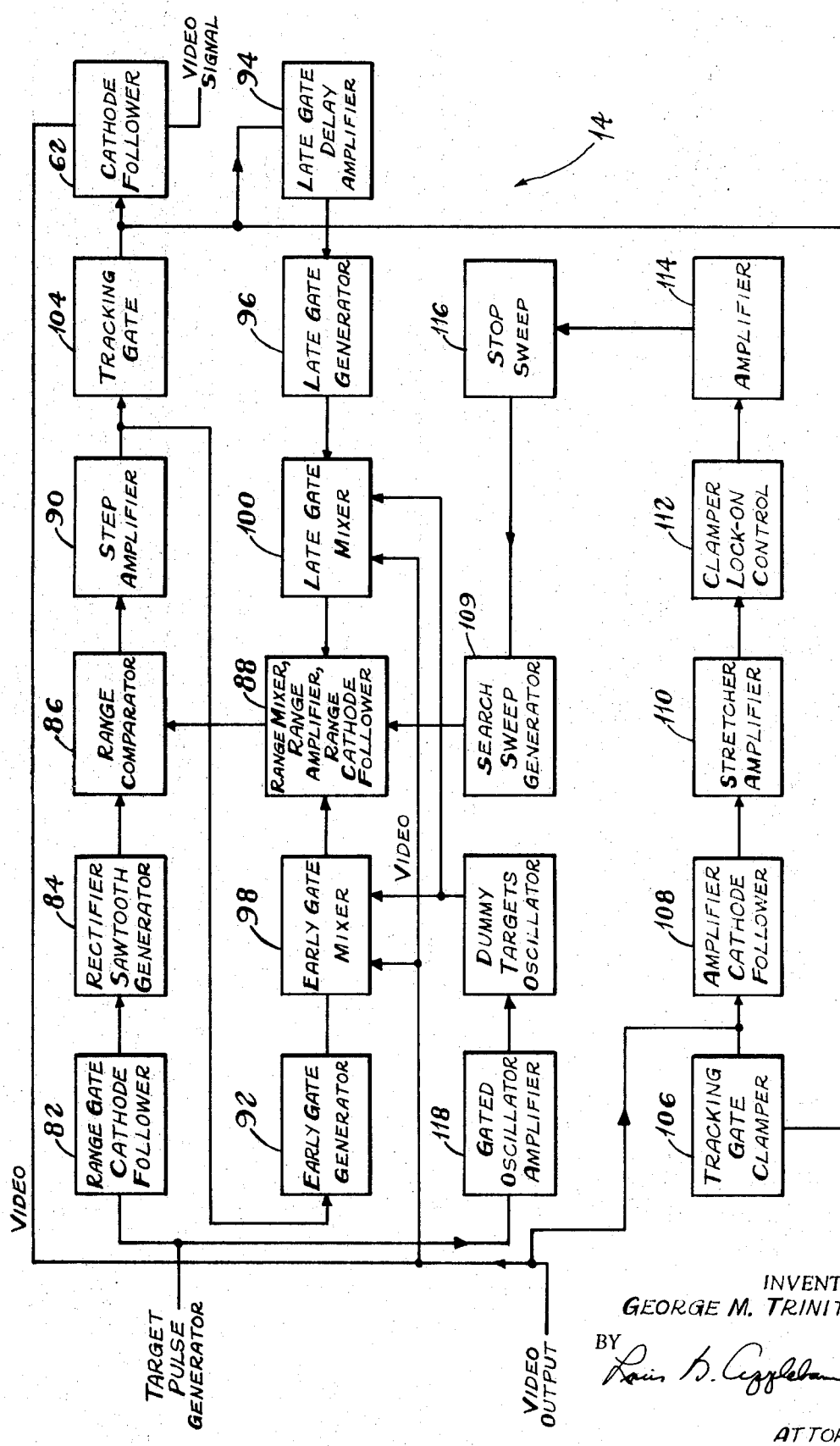

RADAR PRESENTATION SIMULATOR

The present invention generates a radar presentation with operational signals that would normally occur in the operation of many aircraft tail turret fire control systems. The invention's overall function is to have this presentation appear on a replica of the turret operator's console so the operator will receive valuable experience in the use of the fire control system by the operation of realistic replicas of the original equipment performing as the actual equipment would.

Therefore, it is an object of the present invention to provide a realistic presentation of a radar presentation of an aircraft's flight path.

Another object of the present invention is to realistically simulate the operation of a fire control system.

A further object of the instant invention is to provide trainees with realistic experience in the operation of fire control systems.

Other objects and many of the attendant advantages of this invention will be readily appreciated as the same becomes better understood by reference to the following detailed description when considered in connection with the accompanying drawing, which is a block diagram of a range tracker, showing a preferred embodiment of the invention.

The video signal applied to the range tracker is introduced to cathode follower 62, which acts as a mixer when the range tracking circuits are in operation. The video signal from the cathode follower 62 can be applied to any suitable display, such as a video cathode follower and spiral unblanking tube (not shown) of a student's scope.

The sync input from a master oscillator in a target pulse generator (not shown) is applied to the range gate 82, which generates a square wave at the PRF of the master oscillator. The square wave is rectified to remove the positive excursion and applied to sawtooth generator 84. The negative pulse cuts off the sawtooth generator 84, and a linear sawtooth is generated and applied to the plate of the range comparator 86. A source of voltage for the cathode of the range comparator is the range cathode follower 88, which provides a voltage proportional to the present range of the target as determined by the automatic tracking circuits. The generation of this latter voltage is discussed below. The output of the range comparator is that portion of the sawtooth signal remaining after the sawtooth amplitude exceeds the present-range voltage, derived from one of the two sources. The output is amplified by an amplifier 90 and used as a trigger for the early gate generator 92 and the tracking-gate generator-cathode follower 104.

The output of the stepping amplifier 90 is coupled to the early gate generator 92, which is a thyratron-tube gate circuit. The early gate generator 92 produces a square wave of short duration, the time is determined by a delay network in the plate circuit of the generator 92. The output of the tracking-gate generator-cathode follower 104 is applied to amplifier 94, and the circuit-delayed signal is applied to the late-gate generator 96. The time-delay relationship between the early gate and late-gate waveforms is less than one microsecond. The outputs of the gate generators are applied respectively to two mixer stages 98 and 100 respectively. The video output from a target pulse generator is also applied to these mixers 98 and 100. Thus the mixer stages provide discrimination in range with respect to the gate and video waveforms. If, for example, the target signal range is decreasing, the early gate mixer output exceeds that of the late-gate mixer. Since the master oscillator provides target pulse initiation as well as early gate and late-gate generation, there is a synchronous relationship between the signals. The outputs of the mixer stages are applied to the range mixer stage 88, a diode whose conduction and output is determined by the magnitude relationship between the mixer signals. The output of 88 is developed across a capacitor, and the charge on the capacitor is proportional to range. The capacitor charge voltage is applied through a cathode follower back to the range comparator 86 as the present-range voltage. If the target range changes, the charge on the capacitor changes and the voltage fed back to the range comparator is varied. Changing the range comparator voltage causes the range of the tracking gate to change. The system is thus composed of a fast-acting loop which provides near-instantaneous changes in the tracking gate for changes in the target position. The output of the tracking-gate generator-cathode follower 104 is also fed to the tracking gate clamper 106. Normally 106 is conducting, and it attenuates the video signals applied to the amplifier cathode follower 108. During the interval a tracking gate is generated, the tracking gate cuts off the tracking gate clamper 106 and permits the amplification of any video signal that is coincident with the tracking-gate signal. Before the development of a video signal the search-sweep generator 109 causes the charge on the present-range capacitor in the range mixer-amplifier-cathode follower 88 to sweep from minimum to maximum range and recycle. Since this voltage is fed back to the diode range comparator 86, the range position of the tracking gate is constantly being changed. At the time there is coincidence between the tracking gate and a video signal, the tracking gate clamper 106 stops conducting and the tracking gate amplifier 108 amplifies the video signal. The output of the tracking gate amplifier 108 is stretched and again amplified 110, then applied to the lock-on control tube 112. The lock-on control tube 112 causes the lock-on relay amplifier to energize, which automatically initiates the lock-on operation. The stretched signal is amplified by amplifier 114 and applied to the stop-sweep diode 116. The stop-sweep diode 116 conduction cuts off the search-sweep generator, and the charge on the present range capacitor is then determined by the output of the early gate and late-gate mixers.

Another checkout procedure is the operation of the automatic range-tracking circuits. By placing the dummy targets switch in the on position, the sync pulse from the master oscillator is used to gate-on the gated oscillator 118. The oscillator provides a series of dummy targets (or range markers) displaced in range by 500 yards. After amplification these signals are applied to the early gate and late-gate mixer stages. As discussed above, the automatic range-tracking circuit functions to lock the tracking gate and video signals together. This lock-on action is seen on the C scope and A-B scope as coincidence between the two video signals. To cause the tracking-gate signal to move out in range and lock-on to the next target, the range out switch is depressed. This action causes a voltage to be fed back to the present-range capacitor, thus increasing the charge and moving the tracking gate out in range. The tracking gate will then lock-on to the succeeding video signal.

Obviously many modifications and variations of the present invention are possible in the light of the above teachings. It is therefore to be understood that within the scope of the appended claims the invention may be practiced otherwise than as specifically described.

What is claimed is:

1. A fast acting range tracker supplied with a sync input signal of a first frequency, and a video input signal, comprising;

range gate means, for producing a bipolar square wave at a pulse repetition frequency equal to the frequency of said sync input signal, rectifier means, coupled to said range gate means, for blocking positive portions of said bipolar square wave, thereby providing negative voltage output signals, sawtooth generator means, coupled to said rectifier means, for producing a linear sawtooth voltage waveform, controlled by the negative voltage output signals, range comparator means, coupled to said sawtooth generator means having two inputs, a first of which is coupled to the output of said sawtooth generator means, for providing a track gate voltage which is proportional in magnitude to the difference between the magnitudes of the two input voltages applied thereto;

range mixer means, coupled to the second input of said range comparator means, having a plurality of inputs for providing an output voltage whose magnitude is a function of the input signals, tracking gate means coupled to the output of said range comparator means, early and late gate means, having a video input signal and a track gate voltage input for providing discrimination in range with respect to said two input signals, wherein said early and late gate means include, a late gate delay means whose input is coupled to the output of said tracking gate means, a late gate generator means, whose input is coupled to the output of said late gate delay means, a late gate mixer means, having a plurality of inputs, one of which inputs is derived from the output of said late gate generator means, early gate generating means having an input which is coupled to the output of said range comparator means, and an early gate mixer having a plurality of inputs, one of which inputs is coupled to the output of said early gate generator means.

2. The device as in claim 1, wherein said range mixer means include, a diode means whose conduction and output is determined by the magnitude of the input signals coupled to the range mixer means.